US007461721B2

(12) United States Patent
Aulanko et al.

(10) Patent No.: US 7,461,721 B2
(45) Date of Patent: Dec. 9, 2008

(54) ELEVATOR AND TRACTION SHEAVE OF AN ELEVATOR

(75) Inventors: Esko Aulanko, Kerava (FI); Jorma Mustalahti, Hyvinkää (FI)

(73) Assignee: Kone Corporation, Helsinki (FI)

( * ) Notice: Subject to any disclaimer, the term of this patent is extended or adjusted under 35 U.S.C. 154(b) by 42 days.

(21) Appl. No.: 10/665,532

(22) Filed: Sep. 22, 2003

(65) Prior Publication Data

US 2004/0065513 A1 Apr. 8, 2004

Related U.S. Application Data

(63) Continuation of application No. PCT/FI02/00153, filed on Feb. 25, 2002.

(30) Foreign Application Priority Data

Mar. 19, 2001 (FI) ................................ 20010555

(51) Int. Cl.
*B66B 11/08* (2006.01)
*B66D 1/00* (2006.01)
*F16H 55/36* (2006.01)

(52) U.S. Cl. ...................... 187/254; 187/251; 254/266; 474/175; 474/178

(58) Field of Classification Search ................. 187/251, 187/254, 264, 266, 414; 254/266, 393, 390; 474/166, 168, 177, 178
See application file for complete search history.

(56) References Cited

U.S. PATENT DOCUMENTS 3,279,762 A * 10/1966 Bruns ........................ 254/266
4,030,569 A * 6/1977 Berkovitz .................. 187/254
4,465,161 A 8/1984 Ohta et al.
6,267,205 B1 * 7/2001 Piech et al. ................ 187/292
6,371,448 B1 * 4/2002 De Angelis ................ 254/374

FOREIGN PATENT DOCUMENTS

JP 59 102787 A 6/1984
JP 59164450 * 9/1984
SU 1641759 A1 * 1/1991

OTHER PUBLICATIONS

Patent Abstracts of Japan, vol. 003, No. 126 (Oct. 20, 1979) & JP 54 104145 A (Aug. 16, 1979).
Patent Abstracts of Japan, vol. 006, No. 207 (Oct. 19, 1982) & JP 57 114061 A (Jul. 15, 1982).
Patent Abstracts of Japan, vol. 2000, No. 02 (Feb. 29, 2000) & JP 11 325200 A (Nov. 26, 1999).
Patent Abstracts of Japan, vol. 1997, No. 02 (Feb. 28, 1997) & JP 08 277082 A (Oct. 22, 1996).

* cited by examiner

*Primary Examiner*—Evan H Langdon
(74) *Attorney, Agent, or Firm*—Birch, Stewart, Kolasch & Birch, LLP

(57) ABSTRACT

An elevator hoisting rope set (3) suspends a counterweight (2) and an elevator car (1). The elevator has one or more rope pulleys provided with rope grooves, one of said rope pulleys being a traction sheave (7) that moves the hoisting ropes (3). At least the traction sheave (7) has against the hoisting rope (3) a coating adhesively attached to it and increasing the coefficient of friction. At least the traction sheave (7) and the hoisting ropes (3) together form a material pair in which the hoisting ropes (3) bite into the traction sheave (7), maintaining a grip sufficient for the operation of the elevator even in an exceptional situation where the coating (102) increasing the coefficient of friction on the surface of the traction sheave (7) is lost.

12 Claims, 3 Drawing Sheets

ELEVATOR AND TRACTION SHEAVE OF AN ELEVATOR

This application is a Continuation of copending PCT International Application No. PCT/FI02/00153 filed on Feb. 25, 2002, which designated the United States, and on which priority is claimed under 35 U.S.C. § 120, the entire contents of which are hereby incorporated by reference.

FIELD OF THE INVENTION

The operation of a conventional traction sheave elevator is based on a solution where steel ropes used as hoisting ropes and at the same time as suspension ropes are moved by means of a metallic, often cast-iron traction sheave driven by a drive machine. The movement of the hoisting ropes produces a movement of the counterweight and elevator car suspended by them. The driving power from the traction sheave to the hoisting ropes, as well as the braking power in braking by means of the traction sheave is transmitted by friction between the traction sheave and the ropes.

DESCRIPTION OF THE BACKGROUND ART

The coefficient of friction between the material of the metallic traction sheaves used and the hoisting ropes is often insufficient as such to maintain an adequate grip between the traction sheave and the hoisting ropes in ordinary conditions of elevator operation. The friction and the forces transmitted by the ropes are increased by shaping the rope grooves of the traction sheave, or e.g. by providing the rope grooves with a coating that increases the coefficient of friction. In elevators provided with coated traction sheaves, it is possible in exceptional conditions, e.g. in the event of a fire, that the coating on the surface of the traction sheave is destroyed by being burned or melted off. In such a situation, the coefficient of friction between the traction sheave and the hoisting ropes becomes insufficient and elevator movements can not be controlled. The loss of an adequate grip between the traction sheave and the hoisting ropes is a problematic and dangerous situation in respect of elevator operation and safety. When the coating is damaged, the system's ability to maintain the functionality of the elevator is impaired and at the same time the reliability of the elevator may change as a result of reduced grip especially in a situation where a large imbalance prevails between the elevator car and the counterweight. Such a situation occurs when the elevator has no load or is heavily loaded.

One solution to the problem of reduced grip resulting from loss of the coating is disclosed in specification U.S. Pat. No. 4,465,161. The solution proposed here is to provide the traction sheave with toothings under the coating in order to achieve a better grip between the traction sheave and a steel wire rope after the coating has been destroyed. A problem with such toothings, which are implemented by a known technique, is that the hoisting rope comes into contact with the traction sheave when the coating disappears, and this may damage the hoisting rope and its structure. Especially a heavy contact between the toothing and the hoisting rope may damage the rope, which may even result in the rope being broken. This is a definite safety risk. The reliability of the elevator also changes as a result of the hoisting rope being damaged, which leads to a hazard especially in a situation where the elevator is heavily loaded. The loss of the coating in a traction sheave implemented by prior-art techniques also has the consequence that, after the toothing and the steel wire rope have come into contact, it is often necessary to replace both the traction sheave and the hoisting rope as both have been damaged. This causes considerable additional costs.

BRIEF SUMMARY OF THE INVENTION

The object of the present invention is to achieve an elevator in which the grip of the traction sheave on the hoisting rope is sufficient even in problem situations where the coating of the traction sheave is lost or damaged. A further object of the invention is to eliminate or avoid the drawbacks of prior-art solutions and to achieve a traction sheave that has a sufficient grip on the hoisting rope even after the coating has been lost and that is also durable and spares the rope against wear and damage. A further object of the invention is to disclose a new type of traction sheave that guarantees a sufficient grip between the traction sheave and the hoisting rope after the coating on the surface of the traction sheave has been lost. It is also an object of the invention to apply the engagement between rope and traction sheave to diverting pulleys that may be comprised in the elevator system.

In the elevator of the invention, the traction sheave provided with a coating or at least its outer rim is made of a material such that the hoisting rope will bite into it after the coating on the surface of the traction sheave has been lost. The traction sheave is manufactured from material that permits the rope to effectively bite into the traction sheave material. Thus, as the hoisting ropes bite into the traction sheave material, the elevator will maintain the required grip even in exceptional situations where the coating of the traction sheave is lost or damaged. The traction sheave and the hoisting rope therefore form a material pair that is so chosen that a sufficient grip is achieved between the traction sheave and the rope in a situation where the coating on the surface of the traction sheave has been lost. In such a material pair, the hoisting rope bites into the traction sheave, thus producing a grip between them as is required for the operation of the elevator. When a softer material is used in the traction sheave than in the hoisting ropes and a material that permits the hoisting rope to bite into it, an effect protecting the hoisting rope is achieved. The hoisting rope bites into the traction sheave material while preserving its properties, because it is very unlikely that the hoisting rope itself should be damaged. In the solution of the invention, the hoisting rope is made of hard and thin wires that bite into the material of the traction sheave, thereby maintaining a sufficient grip between them. As the wires of the hoisting ropes are made of a very hard material, especially in thin and super-strong ropes, the use of e.g. soft steel, aluminum, cast iron, brass or some other material appropriate for the purpose as traction sheave material will provide a sufficient grip between them after the coating on the surface of the traction sheave has been lost. A sufficient grip between the traction sheave and the hoisting rope can also be implemented by adding under the coating of the traction sheave an insert that the hoisting rope will bite into in the same way as it can bite into the traction sheave itself as described above. In this case, it is not necessary that the traction sheave and the hoisting rope should form a material pair in which the hoisting rope bites into the traction sheave material; instead, the insert added forms the material pair in question with the hoisting rope. A sufficient grip between the traction sheave and the hoisting rope in a situation where the coating increasing the coefficient of friction on the surface of the traction sheave has been lost can be implemented by providing in the traction sheave material under the coating in the rope groove a roughened area that, when in contact with the hoisting rope, will produce a sufficient grip. The aim is not that the elevator according to the invention should work optimally for a long time in the exceptional circumstances in question in which the coating on the surface of the traction sheave is lost or damaged, but the arrangement according to the invention will allow the elevator to perform safely for a required period of time. This is a safety arrangement in an elevator, designed to ensure that the elevator will work temporarily safely in an exceptional situation as mentioned above. The grip between the traction sheave and the hoisting rope in a situation where the coating of the traction sheave has been lost or damaged is a temporary property, which means that the elevator has to be serviced as soon as possible after the coating has been damaged. The elevator or traction sheave of the invention can also be provided with a detector that produces a signal indicating that the coating of the traction sheave has been lost or damaged. The detector provides information about damage to the coating of the traction sheave.

By applying the invention, the following advantages can be achieved:

- after the coating has been lost, a grip sufficient for elevator operation is still maintained between the traction sheave and the hoisting rope,
- the probability of the hoisting rope being damaged in connection with a contact between the traction sheave and the hoisting rope is considerably smaller than in solutions implemented by prior-art techniques
- the properties of the hoisting ropes are not impaired after a loss of the coating, which guarantees that the functionality and reliability of the elevator are maintained even in exceptional conditions
- an elevator that is safe for users and remains functional even in exceptional conditions where the coating of the rope pulleys, especially the traction sheave, has been lost
- after a contact has occurred between the material of the outer rim of the traction sheave and the hoisting rope due to a loss of the coating, it is often only necessary to replace the traction sheave while the hoisting ropes need not be replaced, which means a considerable saving in the costs
- as it is possible to use thin wires in the ropes and because thinner wires can be made stronger, the hoisting ropes can be correspondingly thinner, which means that smaller rope pulleys can be used, which again allows space saving and lay-out solutions of lower cost
- the required grip between the hoisting rope and the traction sheave is simple and advantageous to implement
- the bottom of the rope groove under the coating can also between provided with groove shapes that allow a quicker and more secure grip, making it possible to achieve a more secure grip between the traction sheave and the hoisting rope
- a sufficient grip between the traction sheave and the hoisting rope can also be implemented by providing a roughened area on the bottom of the traction sheave rope groove under the coating
- it is possible to manufacture only the outer rim of the traction sheave from a material permitting the rope to bite effectively into it
- safe elevator operation temporarily in a situation where the coating of the traction sheave has been lost.

BRIEF DESCRIPTION OF THE DRAWINGS

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the following, the invention will be described in detail with reference to the attached drawings which are given by way of illustration only, and thus are not limitative of the present invention, and wherein.

DETAILED DESCRIPTION OF THE INVENTION

Figure 1:
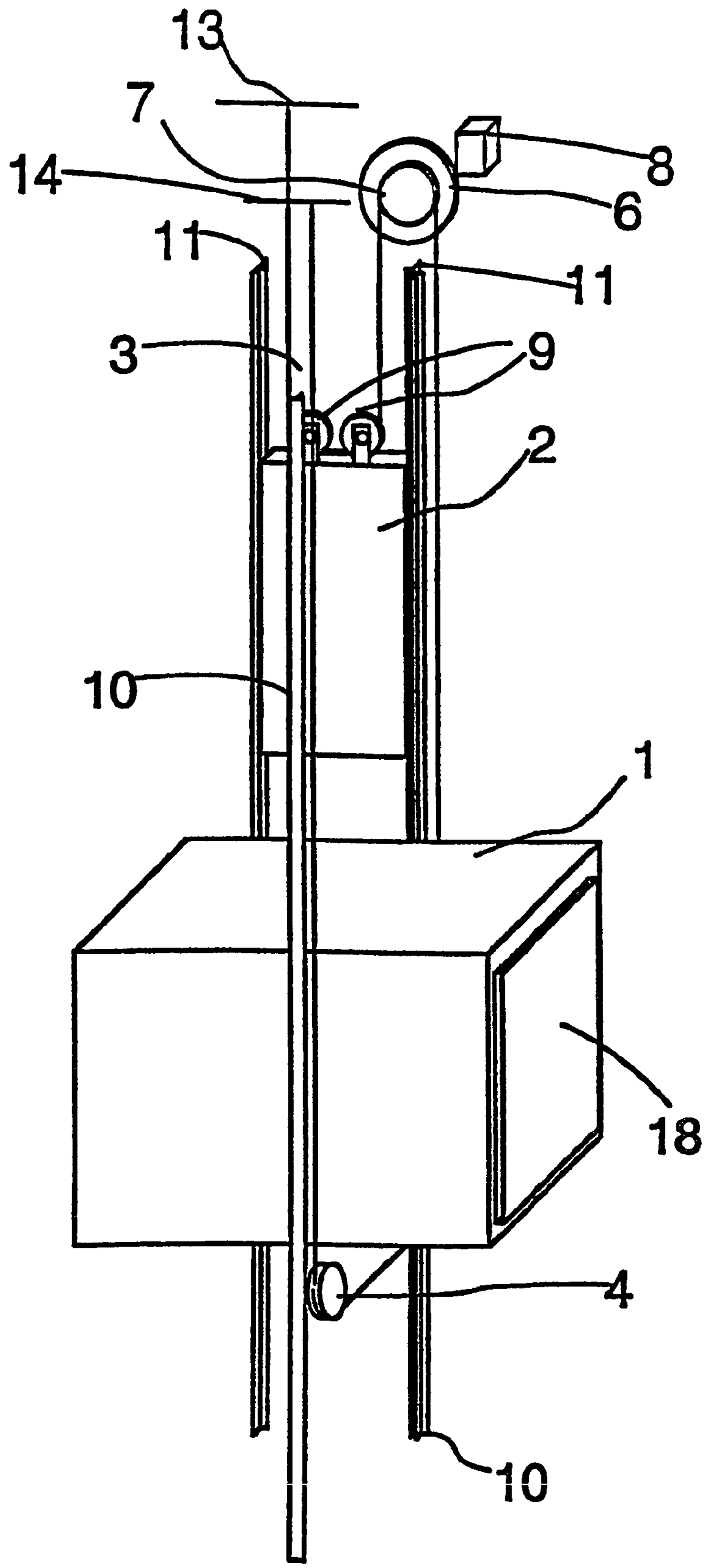
FIG. 1 presents diagram representing an elevator according to the invention.

FIG. 1 is a diagrammatic representation of the structure of an elevator. The elevator is preferably an elevator without machine room, with a drive machine 6 placed in the elevator shaft, although the invention is also applicable for use in elevators having a machine room. The hoisting ropes 3 of the elevator run as follows: One end of the rope set is immovably fixed to an anchorage 13 in the upper part of the shaft above the track of the counterweight 2 moving along counterweight guide rails 11, from where the ropes go downwards to diverting pulleys 9 suspending the counterweight and rotatably connected to the counterweight 2, and from these diverting pulleys 9 the ropes 3 go further upwards to the traction sheave 7 of the drive machine 6, running over the traction sheave along rope grooves provided in it. From the traction sheave 7 the ropes 3 go downwards to the elevator car 1 moving along car guide rails 10, passing under it via diverting pulleys 4 used to suspend the elevator car on the rope set, and finally from the elevator car upwards to an anchorage 14 in the upper part of the shaft, where the second end of the rope set 3 is immovably fixed. Anchorage 13 in the upper part of the shaft, the traction sheave 7 and the diverting pulley 9 suspending the counterweight on the ropes are preferably so disposed in relation to each other that both the rope portion going from the anchorage 13 to the counterweight 2 and the rope portion going from the counterweight 2 to the traction sheave 7 are substantially parallel to the path of the counterweight 2. Similarly, a solution is preferred in which anchorage 14 in the upper part of the shaft, the traction sheave 7 and the diverting pulleys 4 suspending the elevator car on the ropes are so disposed in relation to each other that the rope portion going from the anchorage 14 to the elevator car 1 and the rope portion going from the elevator car 1 to the traction sheave 7 are substantially parallel to the path of the elevator car 1. With this arrangement, no additional diverting pulleys are needed to define the passage of the ropes in the shaft. The rope suspension acts in a substantially centric manner on the elevator car 1, provided that the rope pulleys 4 supporting the elevator car are mounted substantially symmetrically relative to the vertical center line passing via the center of gravity of the elevator car 1.

The drive machine 6, preferably placed in the elevator shaft, is of a flat construction, in other words, the machine has a small depth as compared with its width and/or height, or at least the machine is slim enough to be accommodated between the elevator car and a wall of the elevator shaft. The machine may also be placed differently. Especially a slim machine can be fairly easily mounted above the elevator car. In the elevator shaft it is preferable to place equipment required for the supply of power to the motor driving the traction sheave 7 as well as equipment for elevator control, both of which can be placed in a common instrument panel 8 or mounted separately from each other or integrated partly or wholly with the drive machine 6. The drive machine may be of a geared or a gearless type. A preferable solution is a gearless machine comprising a permanent-magnet motor. The drive machine may be fixed to a wall of the elevator shaft, to the ceiling, to a guide rail or guide rails or to some other structure, such as a beam or frame. In the case of an elevator with machine below, a further possibility is to mount the machine on the bottom of the elevator shaft. FIG. 1 illustrates the economical 2:1 suspension, but the invention can also be implemented in an elevator using a 1:1 suspension ratio, in other words, in an elevator in which the hoisting ropes are connected directly to the counterweight and elevator car without diverting pulleys, or in an elevator implemented using some other suspension arrangement suited for a traction sheave elevator.

Figure 2:
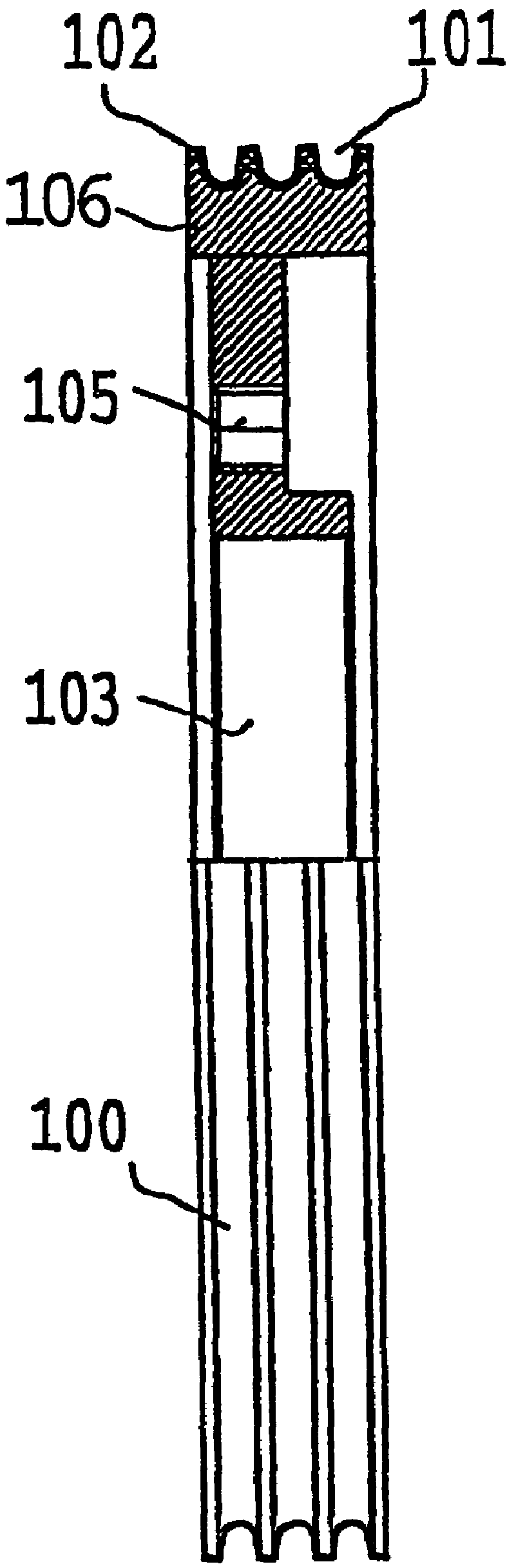
FIG. 2 presents a rope pulley applying the invention.

FIG. 2 presents a partially sectioned view of a rope pulley applying the invention. The rope grooves 101 on the outer rim 106 of the rope pulley are covered by a coating 102. The hub of the rope pulley contains a space 103 for a bearing used to mount the rope pulley. The rope pulley is also provided with holes 105 for bolts, allowing the rope pulley to be fastened by its side to an anchorage in the hoisting machine 6, e.g. to a rotating flange, to form a traction sheave 7, in which case no bearing separate from the hoisting machine is needed. The material of a rope pulley used as a traction sheave so chosen that it forms a material pair with the hoisting rope used, such that the hoisting rope 3 will bite into the rope groove 101 after the coating 102 has been lost. This ensures a sufficient grip between the rope pulley 100 and the hoisting rope 3 in an emergency where the coating 102 of the rope pulley 100 has been lost. This feature allows the elevator to maintain its functionality and operational reliability in the situation referred to. The traction sheave can also be manufactured in such manner that only the outer rim 106 of the rope pulley 100 used as a traction sheave is made of a material that forms a grip increasing material pair with the hoisting rope 3.

Figure 3:
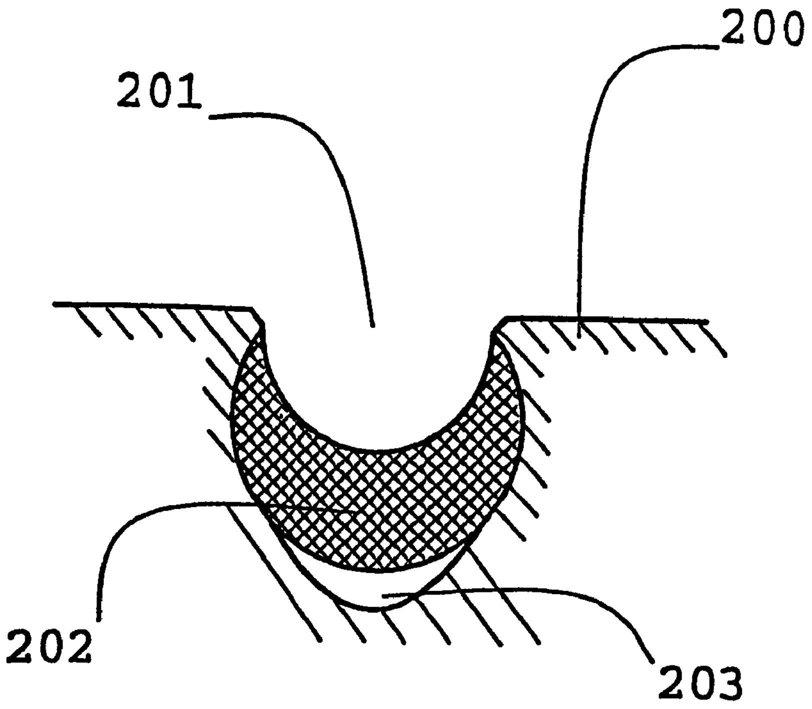
FIGS. 3 and 4 present the rope groove of a traction sheave according to the invention.

FIG. 3 presents a cross-sectional view of a rope groove to illustrate a structural solution designed to improve the grip after the coating has been lost or worn out. The bottom of the rope groove 201 under the coating 202 in the groove has a groove shape 203 that allows the rope to bite more effectively into the groove. After the coating 202 has disappeared, the groove shape 203 or equivalent allows the rope to bite more firmly into the rope pulley, thereby ensuring a sufficient grip between the hoisting rope 3 and the rope pulley 100 used as traction sheave while at the same time protecting the hoisting rope against damage in connection with the contact. The groove shape allowing the rope to bite more effectively into the groove may consist of an undercut groove, a V-shaped groove or a similar groove shape. It may also consist of a number of parallel grooves of different shapes under the coating 202 at the bottom of the rope groove 201, ensuring that the hoisting rope 3 will bite into the rope pulley 100 after the coating 202 has been lost and the grip weakened.

Figure 4:
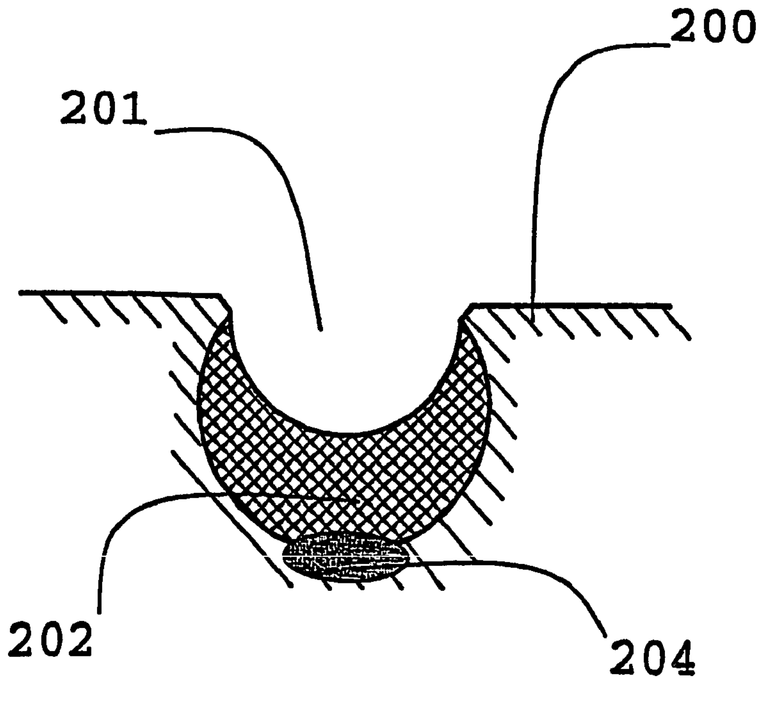

FIG. 4 presents a rope pulley 100 used as a traction sheave and having a coating 202 in a rope groove 201 in which an insert 204 made of a different material has been added under the coating to enhance the bite-in effect. In this solution, in a situation where the coating 202 on the surface of the rope pulley 100 has been lost, the hoisting rope 3 will penetrate into the insert 204, maintaining a sufficient grip between the hoisting rope 3 and the rope pulley 100. The use of an insert makes it unnecessary to form a material pair enhancing the bite-in effect between the hoisting rope and the material of the entire rope pulley 100; instead, it is only necessary to add an insert forming such a material pair. The insert material used may be soft steel, cast iron, brass or some other metal or equivalent material appropriate for this purpose. The insert 204 added on the bottom of the rope groove 201 under the coating 202 may also consist of a tube or a half-tube going around the entire rope pulley 100 along the bottom of the rope groove 201.

The material of at least the rope pulley 100 used as a traction sheave forms together with the hoisting rope 3 used a material pair in which the rope 3 bites into the rope pulley 100. The temporary reduction of friction between the rope pulley 100 and the hoisting rope 3 occurring after a loss of the coating 102 before the rope 3 starts biting into the rope pulley 100 can be diminished by grooves 203 of different shapes made in the bottom of the rope groove 201. With this arrangement, a faster and more secure grip between the rope pulley 100 and the hoisting rope 3 is achieved. The coating material 202 used in the rope groove 201 may consist of rubber, polyurethane or some other elastic material. The use of a coating 202 makes it possible to achieve a large friction between the rope pulley 100 and the hoisting rope 3 as well as a uniform support for the hoisting rope 3, reducing the strain of the interior parts of the rope. In a problem situation where the coating 202 disappears from the surface of the rope pulley 100, the material pair selected and the eventual auxiliary grooving 203 at the bottom of the rope groove 201 can provide a sufficient coefficient of friction quickly and reliably between the hoisting rope 3 and the rope pulley 100. This makes it possible to reach a surety regarding the operation and safety of the elevator about the functionality of the elevator in a problem situation. By using thin and hard steel wires in the hoisting ropes 3, the rope pulley 100 can be manufactured from soft steel, cast iron, aluminum, brass or some other metal or equivalent material suited for the purpose and having properties that make it applicable for use as a material in the rope pulley 100 and allowing the hoisting rope 3 to bite into the material, thereby producing a grip sufficient for the operation of the elevator as well as an effect protecting the hoisting rope against damage in a situation where the coating material 202 on the surface of the rope pulley 100 has been lost. A sufficient grip between the traction sheave 100 and the hoisting rope 3 in exceptional conditions where the coating 202 has been lost can also be implemented by providing a roughened area on the bottom of the rope groove 201 on the surface of the traction sheave material under the coating 202, said roughened area producing a friction between the hoisting rope 3 and the rope pulley 100 that is sufficient for the operation of the elevator.

In the foregoing, the invention has been described by way of example with reference to the attached drawings while different embodiments of the invention are possible within scope of the inventive idea defined in the claims. It is obvious in the scope of the inventive idea that the material pair formed by the hoisting rope and the traction sheave together produce a sufficient grip between the rope and the traction sheave in an exceptional situation where the coating in the rope groove of a rope pulley has been lost.

The invention claimed is:

1. An elevator comprising a hoisting rope set having hoisting ropes of a substantially round cross-section, a counterweight and an elevator car suspended from the hoisting ropes and at least one rope pulley provided with rope grooves having a predetermined depth and a cross section having an upper portion with a predetermined radius of curvature and a lower portion with a different radiius of curvature, the at least one rope pulley being a traction sheave coated with a layer of material increasing the coefficient of friction, the coating layer being located in the upper portion of the grooves with the predetermined radius of curvature to form an auxiliary grooving space without a coating between a bottom of the coating layer and the lower portion of the groove with the different radius of curvature, said traction sheave being driven by a drive machine to move the hoisting rope set, wherein in the auxiliary grooving space and the shape of the auxiliary grooving space provide an increased coefficient of friction between the hoisting rope and the rope grooves relative relative to that provided by a pully groove without the predetermined shape of the auxiliary grooving that allows the hoisting rope to bite into the traction sheave after the coating on the surface of the traction sheave has been lost wherein the elevator is usable when the coating on the surface of the fraction sheave has been lost.

2. The elevator as defined in claim 1, wherein the coating of the at least one rope pulley is made of rubber, polyurethane or other elastic material.

3. The elevator as defined in claim 1 or 2, wherein the hoisting ropes used are ropes having a diameter of loss than 8 mm.

4. The elevator as defined in claim 1, wherein the hoisting ropes contain a load-bearing part twisted from steel wires.

5. A traction sheave for steel wire ropes, the traction sheave comprising rope grooves having a large width and depth upper portion and a smaller width and shallower depth auxiliary groove portion which extends beneath the large upper portion, for hoisting ropes on an outer rim thereof, and a coating layer for increasing friction against the hoisting ropes, the coating layer being located in the upper portion of the grooves but not in the auxiliary groove portion, wherein the material used in the traction sheave in the auxiliary groove portion and the shape of the auxiliary groove portion, provide an increased coefficient of friction between the hoisting rope and the rope grooves relative to that provided by a pully groove without the predetermined shape of the auxiliary groove portion when the coating has been lost.

6. The traction sheave as defined in claim 5, wherein the material of the traction sheave includes a portion made of one of soft steel, aluminum, cast iron and brass.

7. The traction sheave as defined in claim 5, wherein the auxiliary groove portion has a shape allowing the hoisting rope to bite thereinto.

8. The traction sheave as defined in claim 7, wherein the auxiliary groove portion is one of an undercut groove and a V-shaped groove.

9. The traction sheave as defined in claim 5, further comprising an insert in at least one of the rope grooves allowing the hoisting rope to bite into the insert, the insert maintaining a grip between the traction sheave and the hoisting rope when the coating is removed.

10. The traction sheave as defined in claim 1, wherein the sheave has under the coating in the rope groove on the outer rim of the traction sheave a roughened area for maintaining a grip between the hoisting rope and the traction sheave.

11. The elevator as defined in claim 3, wherein the diameter of the ropes is 3-5 mm.

12. A traction sheave for steel wire ropes and the traction sheave comprising rope grooves having a predetermined depth and a cross section having an upper portion, and a lower portion with a predetermined radiius of curvature, for hoisting ropes on an outer rim thereof and a coating increasing friction against the hoisting ropes, the coating layer being located in the upper portion of the grooves to form an auxiliary grooving space without a coating between a bottom of the coating layer and the lower portion of the groove with the predetermined radius of curvature, wherein the material used in the traction sheave in the auxiliary grooving space and the shape of the auxiliary grooving space provide an increased coefficient of friction between the hoisting rope and the rope grooves relative relative to that provided by a pully groove without the predetermined shape of the auxiliary grooving when the coating has been lost.

* * * * *